Dec. 24, 1940.　　　O. WITTEL　　　2,226,188

SPEED CONTROL ASSEMBLY

Filed Feb. 3, 1939

Otto Wittel
INVENTOR

BY Newton M. Perrins
George A. Gillette Jr.
ATTORNEYS

Patented Dec. 24, 1940

2,226,188

UNITED STATES PATENT OFFICE 2,226,188

SPEED CONTROL ASSEMBLY

Otto Wittel, Rochester, N. Y., assignor to Eastman Kodak Company, Rochester, N. Y., a corporation of New Jersey Application February 3, 1939, Serial No. 254,515

13 Claims. (Cl. 188—187)

The present invention relates to a speed control assembly and more particularly to a centrifugal type of speed control for operation at a plurality of predetermined speeds, the highest of which is a multiple of the lowest speed.

While multiple speed control assemblies are well known and have already been used for motion picture apparatus, in every instance the same brake member or friction element is moved to different positions corresponding to the speed desired. As a result, any wear on such friction element or variation from its normal position throws all of the predetermined speeds out of calibration.

The primary object of the present invention is the provision of a brake member for a speed control assembly and comprising a plurality of friction elements for individually engaging the friction member of a speed responsive means to determine a single speed of the assembly.

Another object of the invention is the provision of the speed responsive means including a plurality of spring members and also a plurality of limit members which supervise the range of action of said spring members.

A further object of the invention is the provision of a brake member comprising a circular disk provided with a plurality of clearance holes spaced from the periphery thereof, provided with a plurality of threaded holes between each clearance hole and the periphery of said disk, provided with a plurality of slots each extending from the periphery of the disk through one of said threaded holes to one of said clearance holes, and provided with a plurality of notches on the periphery of said disk and at the end of each slot, the friction elements being threaded into the threaded holes of said disk.

Other and further objects of the invention will be apparent to those skilled in the art from the following disclosure.

The above and other objects of the invention are embodied in a speed control assembly operable at a plurality of predetermined speeds and including the combination with a speed responsive means comprising a plurality of weight members, a friction member movable by said weight members to several positions corresponding to the speed of said responsive means, and a plurality of spring members operating selectively to opposed movement of said friction member by said weight members, of a control means comprising a brake member movable to a plurality of positions each corresponding to one of said predetermined speeds, and a plurality of friction elements on said brake member and each for individually engaging and limiting the movement of said friction member to a position corresponding to one of said predetermined speeds.

Reference is hereby made to the accompanying drawing wherein similar reference characters designate similar elements and wherein.

Figure 1:
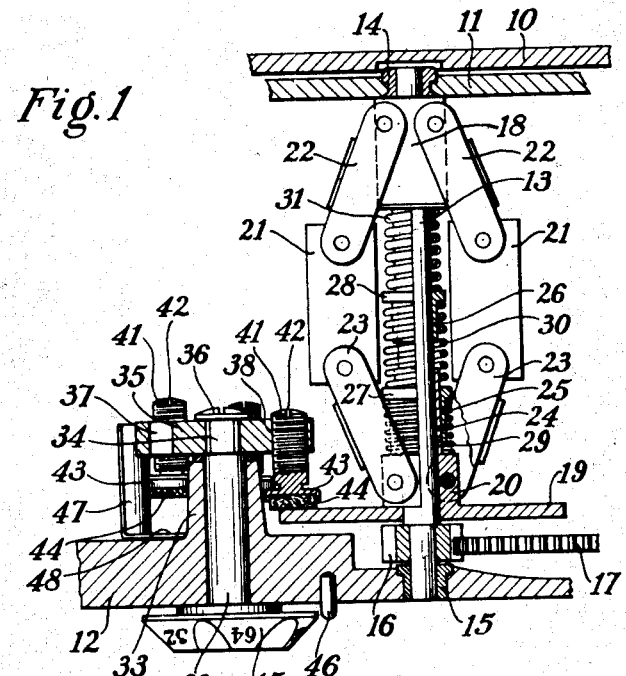
Fig. 1 is a longitudinal section through the speed responsive means and control means of the invention.

The speed control assembly of the invention is particularly well suited for use in motion picture cameras which are conventionally driven by spring motors and which are operated at speeds usually ranging from 8 frames per second to 64 frames per second. However, it is to be understood that said speed control assembly may be well suited for other uses.

In the illustrated embodiment of the invention, the speed control assembly may be mounted in a frame comprising a side wall 10, a mechanism plate 11 and a frame member 12.

The speed responsive means may comprise a rather conventional type of centrifugal governor and includes a friction member movable to positions corresponding to the rotational speed of the governor. For instance, the speed responsive means is mounted on a shaft 13 which is journaled at one end in a bushing 14 in mechanism plate 11 and at the other end in a bushing 15 in the frame member 12. A gear 16 is fastened to shaft 13 and is driven by a large pinion gear 17 which may be driven from any suitable prime mover, such as a spring motor, not shown.

The speed responsive means also includes a plurality of weight members and a friction member which may be arranged in the manner to be described. A sleeve 18 is attached to shaft 13 near one end thereof. A friction disk 19 is mounted upon the other end of shaft 13 and is attached to a collar 20. Said friction disk 19 and collar 20 are axially slidable upon shaft 13. A plurality of weight members 21 are connected between sleeve 18 and friction disk 19 by a plurality of links 22 which are pivoted at one end to sleeve 18 and at the other end to weight members 21 and by a second set of links 23 which are pivoted at one end to weight members 21 and at the other end to collar 20.

A plurality of spring members are arranged within the speed responsive means selectively to oppose movement of the friction disk 19 by the weight members 21. The range of operation of these spring members is supervised by a plurality of limit members. Such limit members may be arranged as shown in Fig. 1 and may comprise an inner sleeve 24 integral with or attached to collar 20, an outer sleeve 25 slidable on said inner sleeve 24 and a floating sleeve 26 slidable upon shaft 13. Said outer sleeve 25 has a flange 27 at one end thereof and said floating sleeve 26 has a flange 28 on one of its ends. The plurality of coil springs are arranged on and between these limit members and are preferably of different strengths. A coil spring 29 encircles outer sleeve 25, is preferably the lightest and weakest spring, and acts between collar 20 and flange 27 normally to space the unflanged end of outer sleeve 25 from collar 20. A coil spring 30 encircles the outermost end of inner sleeve 24 and floating sleeve 26. Said spring 30 is preferably intermediate in strength and acts between flange 27 of outer sleeve 25 and flange 28 of floating sleeve 26 normally to maintain said floating sleeve with its unflanged end spaced from the end of inner sleeve 24. Finally, coil spring 31 is the strongest of the springs and bears at one end against the sleeve 18 and at its other end against the flange 28 of floating sleeve 26.

While all of the coil springs 29, 30, and 31 are acting simultaneously, the sleeves 24, 25 and 26 determine or limit the range of operation of the coil springs. For instance, for operation at the lower speeds only the weakest coil spring 29 will be appreciably compressed. However, when friction disk 19 has been moved by the weight members 21 a distance equal to the space between the unflanged end of outer sleeve 25 and the collar 20, the coil spring 29 is no further compressed because of the abutment of said sleeve 25 against the collar 20. Similarly, the coil spring 30 is not appreciably compressed until after coil spring 29 has been compressed sufficiently to bring sleeve 25 against the collar 20. Increase of the rotational speed of the responsive means then causes compression of coil spring 30 until floating sleeve 26 abuts against the end of inner sleeve 24 whereupon further compression of coil spring 30 is prevented.

The control means forming the other element of the combination constituting the invention comprises a brake member and an indexing member. The brake member is movable to a plurality of positions, each of which corresponds to one of the predetermined speeds for the assembly. Preferably, the brake member comprises a shaft 32 rotatably mounted in a bearing sleeve 33 on or of the frame member 12. The inner end of shaft 32 has a square end 34. A circular disk 35 is provided with a central square opening fitting over said square end 34 and said disk 35 is fastened to shaft 32 by a screw 36. A plurality of friction elements are mounted upon said disk 35 so that only one friction element at a time may engage the friction disk 19 of the speed responsive means. Said disk 35 is provided with a plurality of clearance holes 37 which are spaced around the disk and from the periphery thereof. Disk 35 is also provided with a plurality of threaded holes 38 and with a plurality of slots 39 extending from the periphery of disk 35 through one of threaded holes 38 and into one of clearance holes 37. Notches 40 are provided in the periphery of disk 35 at the outer end of each slot 39 by merely cutting away peripheral portions of the disk 35.

The friction elements preferably comprise threaded stems 41 which are slightly over-sized and are resiliently but firmly held within the threaded holes 38 by reason of the resiliency permitted in portions of disk 35 by the cutting of slots 39. Said threaded stems 41 are each provided in one end with a slot 42 and carry on their other end small cups 43 in which are mounted pads 44 of friction material, such as leather, cork or felt.

The indexing means comprises an indicator 45 carrying speed designations 8, 16, 24, 32, and 64, only a few of which are shown in Fig. 1. An index pin 46 is mounted in frame member 12 adjacent the rim of indicator 45.

A latching means is provided for the purpose of resiliently maintaining the brake member in any selected position. Such a latching means may comprise a plate spring member 47 having a base flange 48 which is fastened to the frame member 12 by a screw 49 and having an arm 50 including a bent portion 51 which enters the notches 40 in the periphery of disk 35 to hold the same resiliently in any set position.

Figure 2:
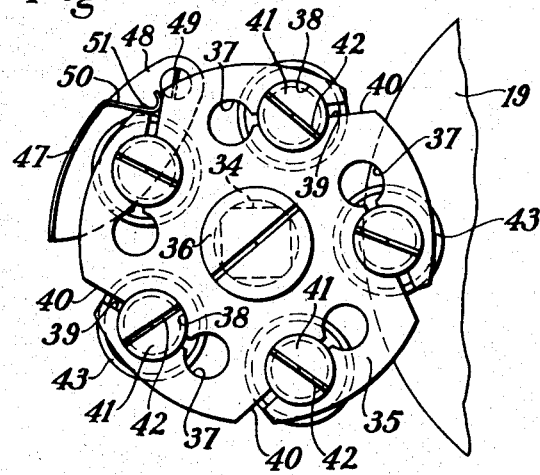
Fig. 2 is a fragmentary plan view to enlarged scale of the brake member of the control means.
Figure 3:
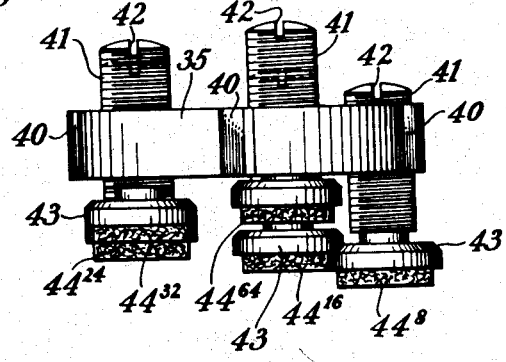
Fig. 3 is a side elevation also to enlarged scale of said brake member.

It will be apparent from Fig. 2 that at one time only one of the friction pads 44 engages the friction disk 19. Also that each friction pad 44 corresponds to each numeral on the indicator 45 and this is indicated by the exponents for the friction pads occurring in Fig. 3. The friction element extending farthest from the circular disk 35 corresponds to the lowest speed, while the shortest friction element corresponds to the highest speed and the friction elements for the intermediate speeds are in corresponding intermediate positions. The relative positions of the friction pads 44 are clearly indicated in Fig. 3.

The operation of the speed control assembly of the invention will now be described. When the speed responsive means is at rest the friction disk 19 will be spaced from the operatively positioned friction element of the brake member. Assume that the brake member is set for a speed of 8 frames per second for a motion picture camera with the graduation 8 on indicator 45 opposite the index pin 46. In such position of the brake member the friction pad 44⁸ will be in a position to engage the friction disk 19. When the rotational speed of the responsive means attains a speed corresponding to 8 frames per second of the camera, the friction disk 19 is moved axially by the weight member 21 until it frictionally engages said pad 44. In a similar manner the indicator 45 may be set in many other positions to bring any of the other friction pads into operative relation with the friction disk 19 and the speed responsive means will rotate at a corresponding speed. Obviously, the coil springs 29, 30 and 31 will be compressed and for the intermediate and higher speeds the coil spring 29 and coil spring 30 will be compressed until the outer sleeve 25 abuts against collar 20 and until the floating sleeve 26 abuts against the end of inner sleeve 24. Although not necessary, it is preferable for best speed regulation to select the coil springs 29, 30 and 31 so that for any one run of the prime mover or spring motor the entire run will be accomplished without appreciably changing the condition of the coil springs 29, 30 and 31. In other words, variation in speed of the speed responsive means for one winding of the spring motor should not be so great as to bring either the outer sleeve 25 or the floating sleeve 26 into or out of abutment with the adjacent sleeves to prevent further compression of the spring operating at that time.

One of the outstanding features of the present invention is that the speed control assembly may be calibrated for each individual speed and any wear of the parts, such as wearing away of the friction pad 44 will have no effect on the calibration for other speeds. It is also possible to move the indicator 45 to either a higher or lower speed during operation of the assembly. It is quite clear that the indicator may be moved to bring any shorter friction element into operative position for operation at higher speeds. If during operation of the assembly the indicator 45 is moved toward a lower speed, the edge of the next lower speed friction pad will bear against the edge of the friction disk 19 and slow down the speed responsive means until friction disk 19 has retracted axially enough to permit the bottom surface of the friction pad to move over the disk 19.

While the friction elements have been shown as threaded into the disk 35, it is to be understood that they may be mounted in any manner which will permit convenient and individual adjustment thereof. Other variations of the speed control assembly will be apparent to those skilled in the art. The scope of the invention is defined by the claims which follow.

Having now particularly described my invention what I desire to secure by Letters Patent of the United States and what I claim is:

1. In a speed control assembly for operation at a plurality of predetermined speeds, the combination with a speed responsive means comprising a plurality of weight members movable by centrifugal forces created therein, a friction member movable by said weight members through several positions each corresponding to the speed of said responsive means, and a plurality of spring members operating selectively to oppose movement of said friction member by said weight members, of a control means comprising a brake member movable to a plurality of positions each corresponding to one of said predetermined speeds, and a plurality of friction elements on said brake member and each for individually engaging and limiting the movement of said friction member to a position corresponding to one of said predetermined speeds.

2. In a speed control assembly for operation at a plurality of predetermined speeds, the highest of which is a multiple of the lowest speed, the combination with a speed responsive means comprising a plurality of weight members movable by centrifugal forces created therein, a friction surface movable by said weight members to several positions each corresponding to the speed of said responsive means, a plurality of spring members of different strengths operatively arranged to oppose movement of said friction member by said weight members, and a plurality of limit members associated with said spring members and arranged to supervise the range of operation of said spring members, of a control means comprising a brake member movable to a plurality of positions each corresponding to one of said predetermined speeds, and a plurality of friction elements on said brake member and each for individually engaging said friction member to limit the movement thereof and the operating range of said spring members to correspond to one of said predetermined speeds.

3. In a speed control assembly for operation at a plurality of predetermined speeds, the combination with a speed responsive means comprising a rotatable shaft, a plurality of weight members rotatable with said shaft and moved by the centrifugal forces created in said weight members, a friction member connected to said weight members and moved thereby, a plurality of springs of different strengths encircling such of springs of different strengths encircling such shaft and for opposing movement of said friction member by said weight members, and a plurality of limit members spaced along said shaft in engagement with said spring members and arranged upon movement of said spring members to become successively operative to limit the range of operation of said spring members, of a control means comprising a brake member movable to a plurality of positions each corresponding to one of said predetermined speeds, and a plurality of friction elements on said brake member and each for individually engaging said friction member to limit the movement thereof and the operating range of said spring members to correspond to one of said predetermined speeds.

4. In a speed control assembly for operation at a plurality of predetermined speeds, the combination with a speed responsive means comprising a rotatable shaft, a plurality of weight members rotatable with said shaft and moved by the centrifugal forces created in said weight members, a friction member connected to said weight members and moved thereby, a plurality of springs of different strengths encircling said shaft and for opposing movement of said friction member by said weight members, and a plurality of limit members arranged along said shaft and engaging said springs to limit their range of action, of a control means comprising an indexing member movable through a plurality of positions each corresponding to one of said predetermined speeds, a brake member connected for movement with said indexing member, and a plurality of friction elements on said brake member, each corresponding to one of said predetermined speeds and arranged individually to engage the friction member of said speed responsive means.

5. In a speed control assembly for operation at a plurality of predetermined speeds, the combination with a speed responsive means comprising weight members movable by the centrifugal forces created therein, and a friction member operatively connected to said weight members and movable to several positions each corresponding to the speed of said responsive means, of a control means comprising a brake member movable to a plurality of positions each corresponding to one of said speeds, and a plurality of friction elements on said brake member and each located individually to engage said friction member of said responsive means for each position of said brake member.

6. In a speed control assembly for operation at a plurality of predetermined speeds, the combination with a speed responsive means comprising weight members movable by the centrifugal forces created therein, and a friction member operatively connected to said weight members and movable through several positions each corresponding to the speed of said responsive means, of a control means comprising a brake member movable to a plurality of positions each corresponding to one of said speeds, and a plurality of friction elements adjustably mounted on said brake member, each located individually to engage said friction member of said responsive means for each position of said brake member, and each adjusted to a position corresponding to each of said predetermined speeds.

7. In a speed control assembly for operation at a plurality of predetermined speeds, the combination with a speed responsive means comprising weight members movable by the centrifugal forces created therein, and a friction member operatively connected to said weight members and movable to several positions each corresponding to the speed of said responsive means, of a control means comprising a brake member movable to a plurality of positions each corresponding to one of said speeds and provided with a plurality of threaded holes, a screw threaded into each of said holes, and a friction pad on the end of each screw, each screw being so located and so adjusted that the friction pad thereon exclusively engages said friction member for each position of said brake member and is in an adjusted position corresponding to one of said predetermined speeds.

8. In a speed control assembly, the combination with a frame member, a brake member mounted for rotation into any one of a plurality of positions and comprising a circular disk provided with a plurality of holes spaced therearound and from the periphery thereof, provided with a plurality of slots each extending from said periphery into each of said holes, and a plurality of notches each on the periphery of said disk at the outer end of each slot, a stem mounted in each of said holes, and a friction pad on one end of each stem, of a spring member mounted on said frame member and having a portion for engaging any one of said notches in the periphery of said disk resiliently to maintain the same in a selected position.

9. In a speed control assembly, the combination with a frame member and a brake member movable through a plurality of positions and comprising a shaft journaled in said frame member, a circular disk mounted on said shaft and provided with a plurality of clearance holes spaced from the periphery of said disk, a plurality of threaded holes between each clearance hole and the periphery of said disk, a plurality of slots each extending from the periphery of said disk through one of said threaded holes to one of said clearance holes, and a plurality of notches each on the periphery of said disk and at the end of each slot, a plurality of screws each threaded into one of said threaded holes, and a friction pad on the end of each screw, of a spring member mounted on said frame member and having a free end with a bent portion for engaging each notch in the periphery of said disk resiliently to maintain the same in a selected position.

10. In a speed control assembly, a brake member comprising a movable support having an edge and which is provided with a plurality of clearance holes spaced therealong and from said edge, provided with a plurality of threaded holes one between each clearance hole and the edge of said support, and provided with a plurality of slots each extending from the edge of said support through one of said threaded holes to one of said clearance holes, a screw threaded into each of said threaded holes, and a friction pad on the end of each screw.

11. In a speed control assembly, a brake member comprising a circular disk which is provided with a plurality of clearance holes spaced therearound and from the periphery thereof, provided with a plurality of threaded holes one between each clearance hole and the periphery of said disk, and provided with a plurality of slots each extending from said periphery through one of said threaded holes to one of said clearance holes, an oversize screw threaded into each of said threaded holes and provided at one end with a slot, and a friction pad on the other end of each screw.

12. In a speed control assembly for operation at a plurality of predetermined speeds the highest of which is a multiple of the lowest speed, the combination with a speed responsive means comprising a shaft which is rotatable about an axis, a plurality of weight members rotatable with said shaft and displaceable with respect thereto by the centrifugal forces so created in said weight members, and a friction member mounted on said shaft and connected to said weight members for movement into a position corresponding to the rotational speed thereof, of a plurality of coil springs encircling said shaft and arranged simultaneously to oppose compression by the displacement of said weight members and said friction member, and a plurality of sleeve members within said coil springs and having flanges for engaging the ends of respective springs normally to space said sleeve members, at least two of which sleeve members are in telescopic relation on said shaft.

13. In a speed control assembly for operation at a plurality of predetermined speeds the highest of which is a multiple of the lowest speed, the combination with a speed responsive means comprising a shaft which is rotatable about an axis, a plurality of weight members rotatable with said shaft and displaceable with respect thereto by the centrifugal forces so created in said weight members, and a friction member mounted on said shaft and connected to said weight members for movement into a position corresponding to the rotational speed thereof, of a plurality of sleeve members, one an inner sleeve member attached to move with said friction member, one an outer sleeve member having a flange and slidable on said inner sleeve, and another a floating sleeve having a flange and slidable on said shaft, and a plurality of coil springs, one of which encircles said outer sleeve normally to space it from said friction member, another which encircles said floating sleeve to space it from said inner sleeve, and another of which encircles the shaft and bears upon the flanged end of said floating sleeve.

OTTO WITTEL.